April 12, 1960 H. W. BODE 2,932,185
MACHINE FOR PREPARING HIDES FOR TANNING
Filed May 13, 1958 10 Sheets-Sheet 1

Inventor
Henry W. Bode

April 12, 1960 H. W. BODE 2,932,185
MACHINE FOR PREPARING HIDES FOR TANNING
Filed May 13, 1958 10 Sheets-Sheet 2

Inventor
Henry W. Bode

April 12, 1960

H. W. BODE 2,932,185

MACHINE FOR PREPARING HIDES FOR TANNING

Filed May 13, 1958

Inventor
Henry W. Bode

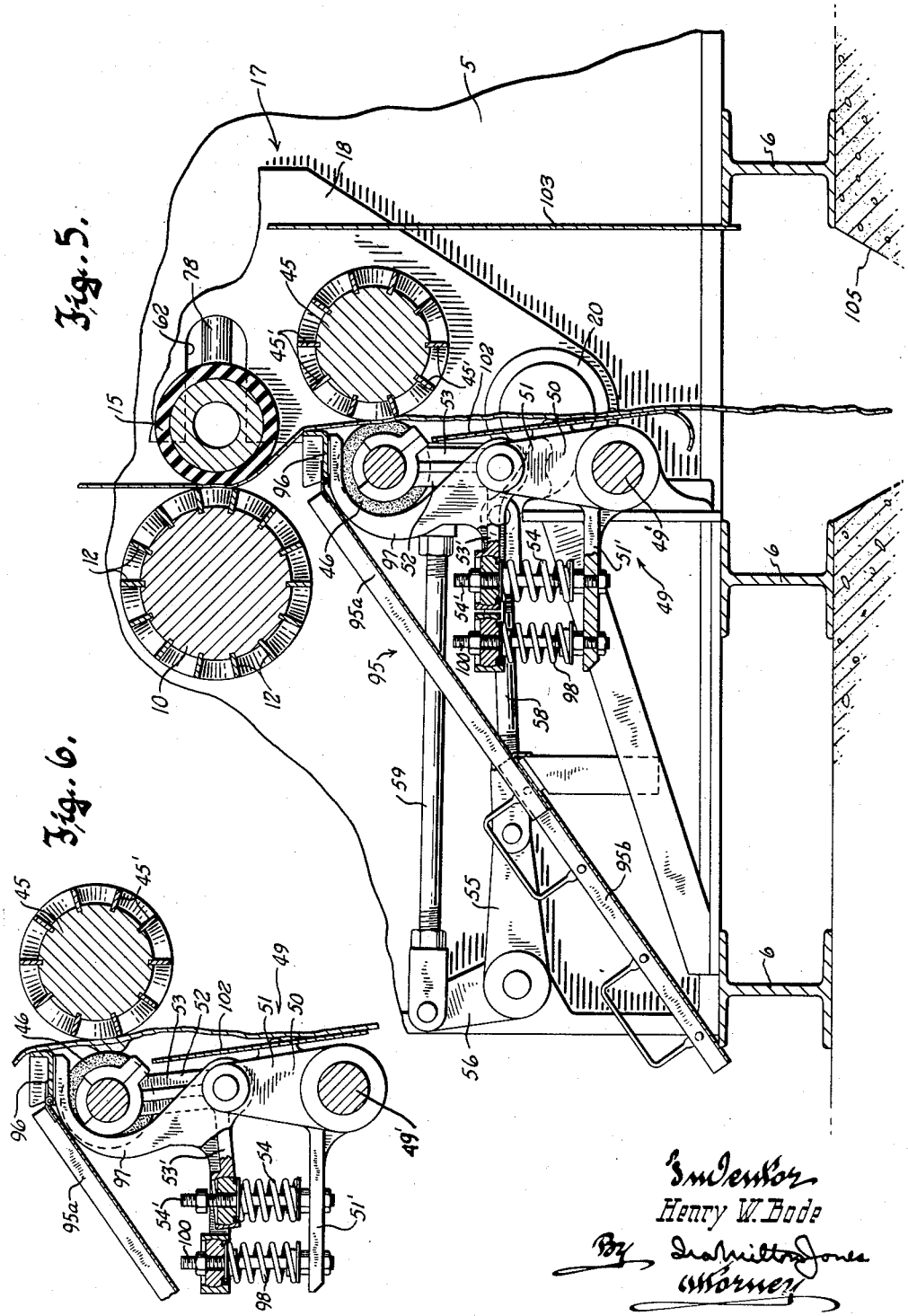

April 12, 1960 H. W. BODE 2,932,185
MACHINE FOR PREPARING HIDES FOR TANNING
Filed May 13, 1958 10 Sheets-Sheet 6

Inventor
Henry W. Bode

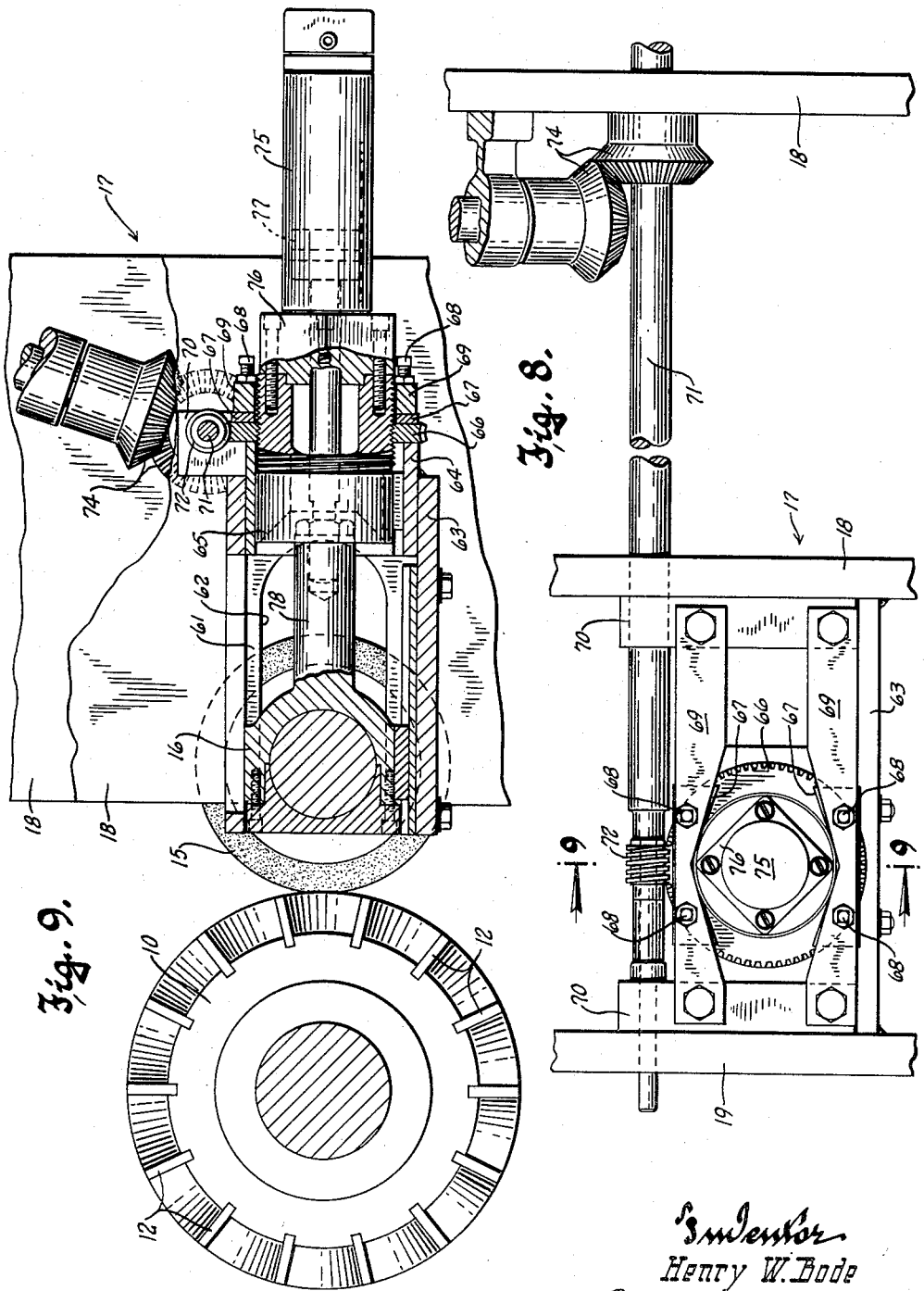

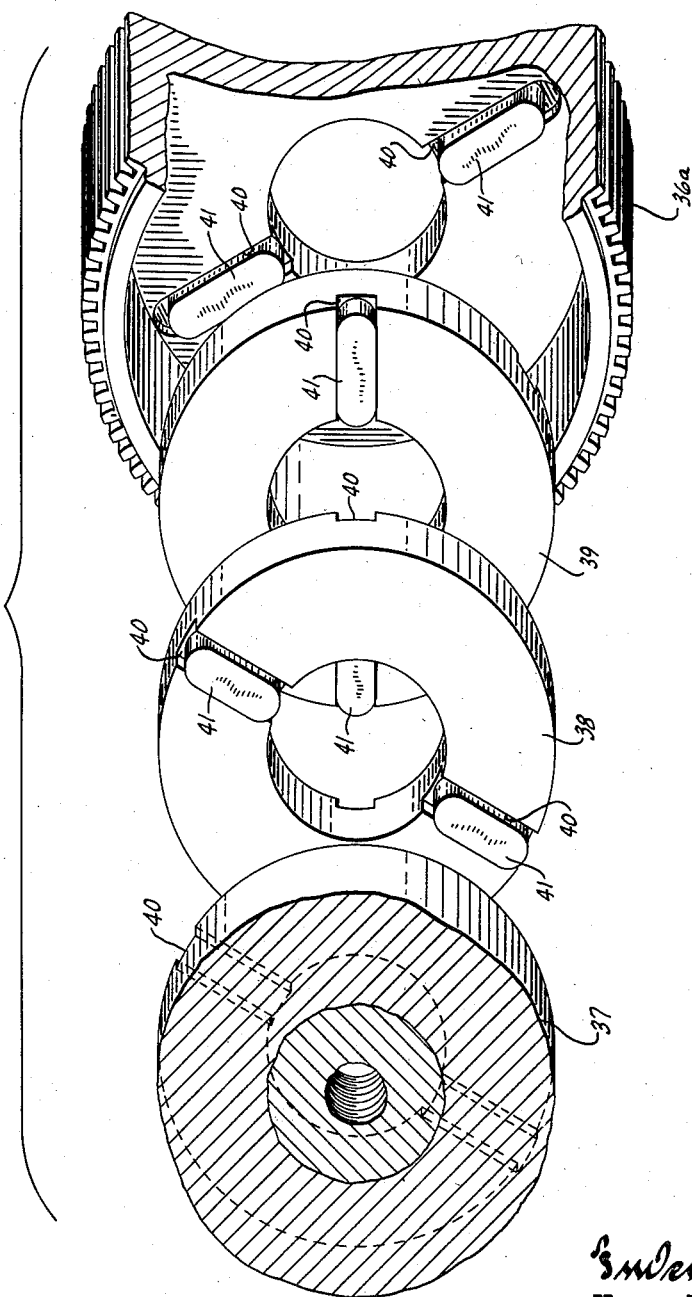

April 12, 1960 H. W. BODE 2,932,185
MACHINE FOR PREPARING HIDES FOR TANNING
Filed May 13, 1958 10 Sheets-Sheet 9
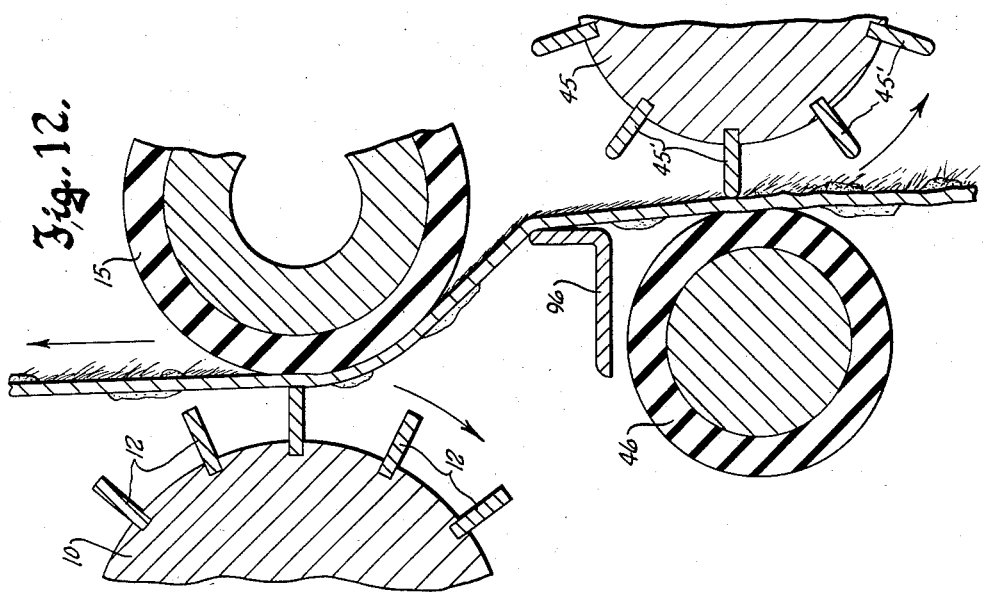
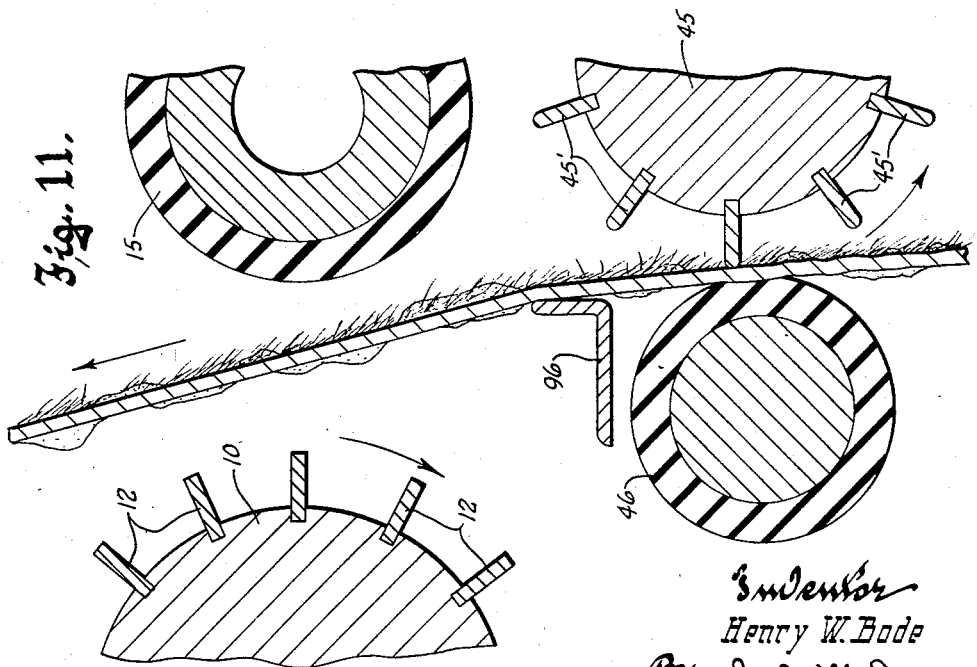
Inventor
Henry W. Bode April 12, 1960 H. W. BODE 2,932,185
MACHINE FOR PREPARING HIDES FOR TANNING
Filed May 13, 1958 10 Sheets-Sheet 10
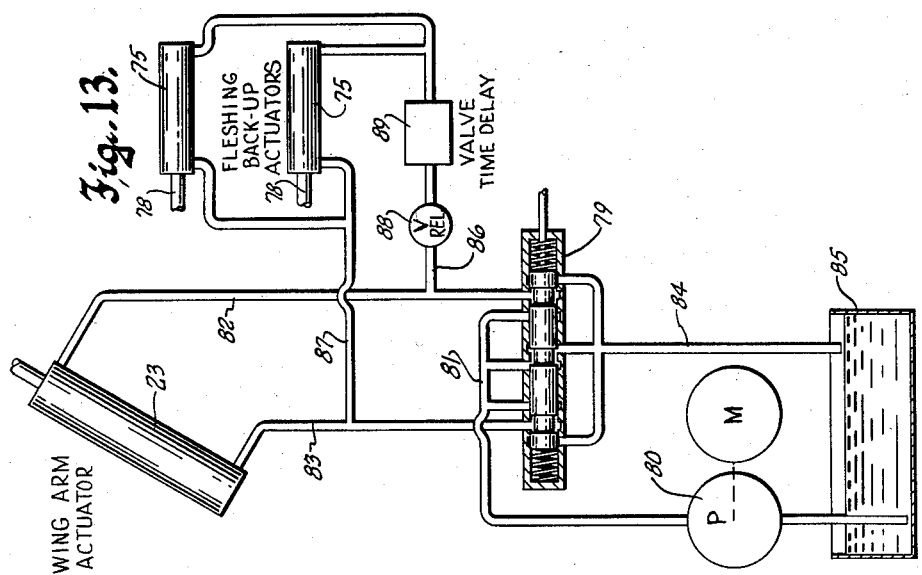
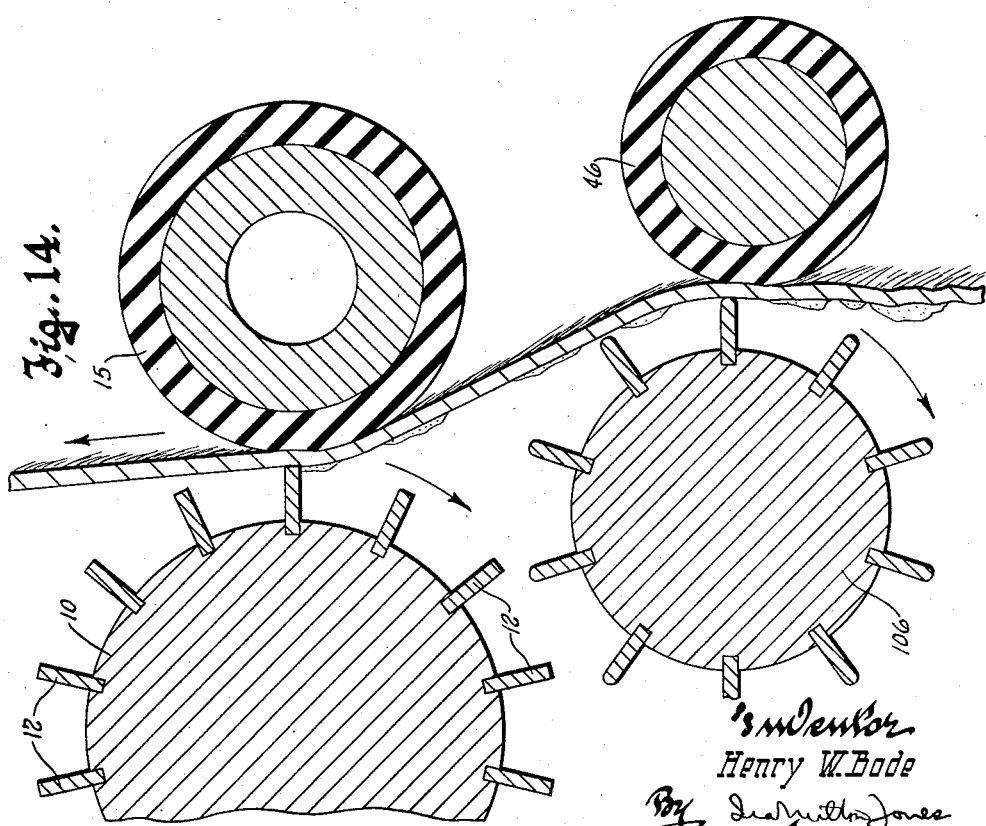
Inventor
Henry W. Bode United States Patent Office 2,932,185
Patented Apr. 12, 1960

2,932,185
MACHINE FOR PREPARING HIDES FOR TANNING

Henry W. Bode, Milwaukee, Wis., assignor to The Chas. H. Stehling Company, Milwaukee, Wis., a corporation of Wisconsin Application May 13, 1958, Serial No. 735,043

19 Claims. (Cl. 69—42)

This invention relates generally to the tanning art, and more particularly to an improved method and machine for preparing fresh, green hides for tanning.

Prior to this invention and that of the copending application Serial No. 670,266, filed July 5, 1957, of which this is a continuation-in-part application which issued as Letters Patent No. 2,869,350, on January 20, 1959, the fleshing of hides, that is the removal of the flesh, fat and other gelatinous material on the flesh side of the hide, was always done at the tannery. The packing houses merely salted the fresh green hides after they were skinned from the carcasses of the slaughtered animals, bundled them and then shipped them to the tannery. Despite the fact that the shipment of the hides in this condition was obviously inefficient and uneconomical, not only because of shipping costs, but also because the flesh and fat adhering to the hides was wasted, it was standard practise with the entire tanning industry.

Clearly it would be more profitable for all concerned if the hides were fleshed at the packing house directly after being removed from the carcasses of the slaughtered animals, and before they were shipped; but this was not done. One of the reasons it was not done, very well may have been the fact that the hides were often extremely dirty on their hair side, with lumps of manure and other dirt adhering thereto. Such adhering lumps of manure and dirt would cause the hide to bulge and be cut by the fleshing knives as the hide passed through the fleshing machine.

Another possible reason why fresh green hides were not fleshed by the packing houses no doubt resided in the fact that no machinery was available to flesh hides in that condition. Experience has shown, for instance, that the conventional fleshing machines can not satisfactorily handle fresh green hides. The spreading or putting-out of such hides is considerably more difficult than it is when the fleshing is done long after the hide has been skinned from the carcass, as was the practice heretofore.

In the light of these observations, it is the general purpose of this invention, like that of the aforesaid copending application, to provide an improved method of preparing fresh green hides for tanning; and also to provide a machine by which the improved method may be economically practiced.

More specifically, it is an object of this invention to provide a machine which will not only successfully flesh green hides, but, in addition, will thoroughly clean the hair side of the hide before the hide is acted upon by the fleshing means.

As those skilled in this art know, the fleshing of hides, which for the sake of accuracy perhaps should be called "de-fleshing," is now generally done by pulling the hide between a backup or pressure applying roll and a rapidly rotating cylinder having sharp-edged knives projecting radially therefrom and extending helically around its circumference. The shape of the blades and their placement upon the cylinder is such that they spread or put-out the hide transversely. In the past, with the fleshing operation being done in the tannery, and upon hides in a considerably different condition from their green fresh state just after removal from the carcass, the putting-out or transverse spreading of the hides by the blades of the fleshing cylinder was sufficiently effective for successful fleshing, but it has been found that when the hide is fresh and green it cannot be properly put-out by the fleshing cylinder itself. It must be straightened before it arrives at the fleshing cylinder. To that end, this invention has as another object to provide a machine especially designed to flesh fresh green hides which incorporates means to straighten the hide before it is presented to the fleshing cylinder, and to hold it in its put-out or straightened condition as it is fed to the fleshing cylinder.

Since the hide should be cleaned of manure and other dirt on its hair side before it is fleshed, the machine of this invention provides demanuring means so placed with respect to the fleshing means that the hide moves from the former to the latter; and another object of the invention is to so construct the means by which the hair side of the hide is cleaned of clumps of manure and other dirt, that the hide will be put-out or spread transversely as it is being cleaned.

To assure that the hide will be cleaned of manure and other dirt on its hair side at the time it is fleshed, the invention has as another of its objects to provide means for delaying the operativeness of the fleshing means until the hide has moved far enough beyond its demanuring means to bring a cleaned portion of the hide into position to be fleshed.

It is, of course, desirable to save the flesh cut from a hide by the fleshing means and keep it uncontaminated by manure or dirt cleaned from the hair side of a hide. Accordingly, it is another object of this invention to provide chute means positioned beneath the fleshing means and pressed against the flesh side of a hide stretched between the fleshing means and the demanuring means to catch and collect all of the flesh cut from a hide and convey it to an area remote from the demanuring means.

Since it is desirable that the force with which a hide is pressed against the side of the fleshing cylinder be adjustable, to accommodate variations in hide thickness, the present invention has as another object the provision of means for finely adjusting the operative position of the backup roll by which the hide is held against the fleshing cylinder.

Also with a view toward accommodating variations in hide thickness and particularly localized areas of excess thickness, the invention has as another of its objects to provide a yieldable support for the backup roll by which the hide is held against the combined demanuring and putting-out cylinder.

Still another object of this invention is to provide a combined putting-out and demanuring means or couple as it might be termed since it constitutes a bladed cylinder, similar to the bladed fleshing cylinder, and a backup roll which couple is so mounted and arranged that upon opening of the machine to permit a hide to be placed in position therein, the complimentary elements of the couple swing widely apart to permit the hide to hang freely therebetween.

In this connection, it is another object of this invention to so mount the backup roll of the combined putting-out and demanuring means or couple that, in the opened condition of the machine, this backup roll is under the fleshing cylinder to further assure against interference with proper placement of the hide as it is placed or thrown into the machine.

Also in this connection it is yet another object of this invention to mount the chute means which catches the flesh and fatty substance cut from a hide by the fleshing means, in such a way that it is retracted along with the back-up roll so that a hide being placed in the machine will not fall onto the chute means.

The invention also contemplates an improvement in the draw rolls by which the hide is pulled out of the machine and, to this end, provides one driven roll coacting with two pressure rolls. The driven roll is geared to the pressure rolls and, to assure that the gears will remain in mesh despite inevitable changes in the center-to-center distances between the rolls resulting from variations in hide thickness, this invention has as another of its objects to provide a flexible driving connection between the driven one of the draw rolls and its driving gear, and means for at all times urging the driving gear into mesh with the gears of the pressure rolls.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention, constructed according to the best mode so far devised for the practical application of the principles thereof, and in which:

Figure 2 is a cross-sectional view taken on the plane of the line 2—2 in Figure 1;

Figure 5 is a cross sectional view through the lower portion of the machine looking in the same direction as Figure 4, but directly ahead of the center of the machine, so as to better illustrate the center bearing support for the backup roll of the combined putting-out and demanuring couple;

Figure 6 is a detail sectional view repeating a portion of the structure shown in Figure 5, but illustrating the manner in which the backup roll of the combined putting-out and demanuring cylinder accommodates unusually thick accumulations of flesh on the flesh side of the hide;

Figure 8 is a detail view taken from the front of the machine and illustrating the mechanism by which fine adjustment of the location of the fleshing cylinder back-up roll is effected;

Figure 9 is a cross-sectional view through Figure 8 on the plane of the line 9—9;

Figure 10 is an exploded perspective view of the elements of the flexible coupling which connects the driven one of the draw rolls with its driving gear;

Figure 11 is an enlarged detail sectional view through the fleshing and the combined putting-out and demanuring couples, illustrating these parts in the postions they occupy the instant after initial closure of the machine;

Figure 12 is a view similar to Figure 11, but showing the illustrated structure as it is during fleshing;

Figure 1:
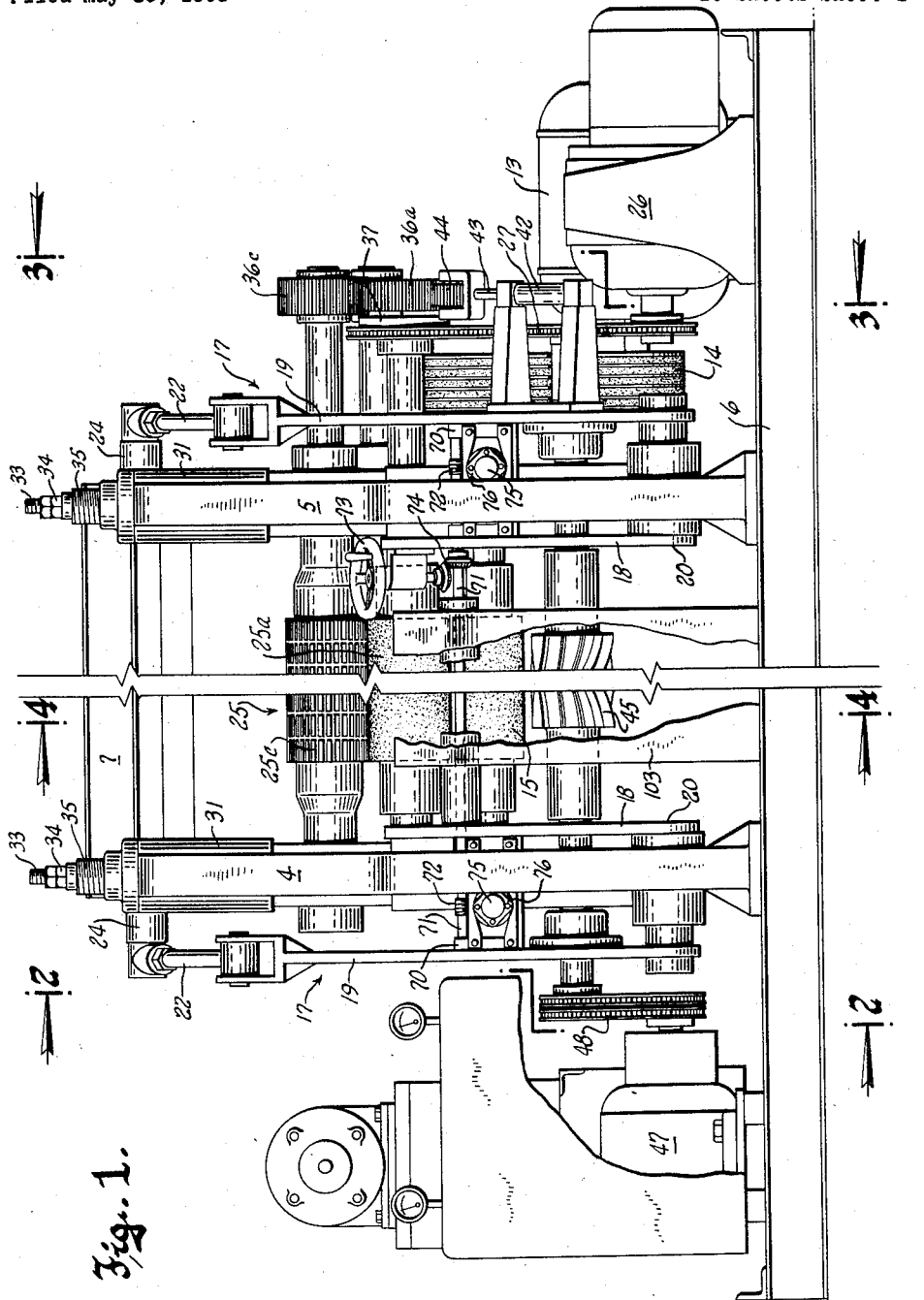
Figure 1 is a front view of the machine of this invention, with the central portion thereof broken away to enable both ends of the machine to be illustrated without objectionably reducing the scale at which the view is drawn.

Figure 13 is a diagrammatic hydraulic diagram of the essential parts of the control and the means by which the machine is opened and closed, and the manner in which the operativeness of the fleshing means or couple is delayed for an interval after the machine is closed; and Figure 14 is a view similar to Figures 11 and 12, but illustrating how the elements of this machine could be employed to achieve only a puting-out or straightening of the hide in its passage to the fleshing cylinder where demanuring or other cleaning of the hair side is not needed, or is done on some other machine.

Referring now more particularly to the accompanying drawings, in which like numerals indicate like parts throughout the several views, the numerals 4 and 5 respectively denote the left and right hand side frames of the machine. These frames are connected by a plurality of parallel rails or beams 6 upon which they stand, and by transverse rails 7, 8 and 9 which are secured to the top and to the upper rear portion of the side frames.

The medial portions of the side frames are open to allow shafts and other parts of the structure to extend through the frames.

One of the main parts of the machine is a fleshing cylinder 10. This cylinder is supported in bearings 11 bolted to the side frames to rotate about a fixed horizontal axis. It is of the conventional type and, therefore, has cutting blades 12 projecting radially from its surface and disposed helically about the cylinder with the direction of the helixes opposite at opposite sides of the center of the roll. This shape and disposition of the blades 12 is, of course, conventional and well known, and accounts for the fact that the fleshing cylinder tends to spread or put-out the hide transversely. A motor 13 located at the right side of the machine and drivingly connected with the shaft of the fleshing cylinder by a Texrope transmission belt 14, or the like, provides a drive for the fleshing cylinder.

The hides to be fleshed are held against the rapidly rotating fleshing cylinder by a backup roll 15 journalled in bearings 16 carried by a swing arm structure 17. The swing arm structure 17 comprises a pair of inner and outer arms 18 and 19, respectively, embracing each side frame, and connected together as at 20; the connection 20 providing means by which the arms are rockably supported on the side frames to swing about a common horizontal axis which is at a level substantially below that of the fleshing cylinder.

A hydraulically actuated crank mechanism, indicated generally by the numeral 21 is mounted on the rear of the machine and is connected to each of the long outer arms 19 of the swing arm structure by tie rods 22 to constrain both pairs of arms to move together. Upon actuation, therefore, the mechanism 21 will swing the entire swing arm structure 17 between a closed position shown in full lines in Figure 2, and an open position indicated in broken lines in the same figure. The hydraulically actuated crank mechanism 21 may be like that illustrated in Patent No. 2,471,984, and, in that event, comprises a hydraulic cylinder 23, the ram of which is drivingly connected with a crank arm 24 through a rack and pinion inside a gear case 23' upon which the cylinder 23 is mounted, to transmit substantially 180° rocking motion to the crank arm.

When the swing arm structure 17 is swung to its closed position and the backup roll 15 carried thereby is in its position bearing against the fleshing cylinder, to thus render the fleshing couple operative, draw rolls collectively indicated by the numeral 25 are also operative to draw a hide upwardly through the fleshing couple. One of the draw rolls, designated 25a, is power driven and has a resilient surface; the other two, designated 25b and 25c, are pressure rolls. These have a fluted or interrupted hard metal surface. The power driven roll 25a is carried by the swing arm structure; but the two rolls are supported by the side frames. The drive for the power driven draw roll 25a comprises a motor 26 drivingly connected to the shaft of the driven draw roll by a sprocket chain 27, an idler 28 being provided to keep the chain taut.

Figure 2:
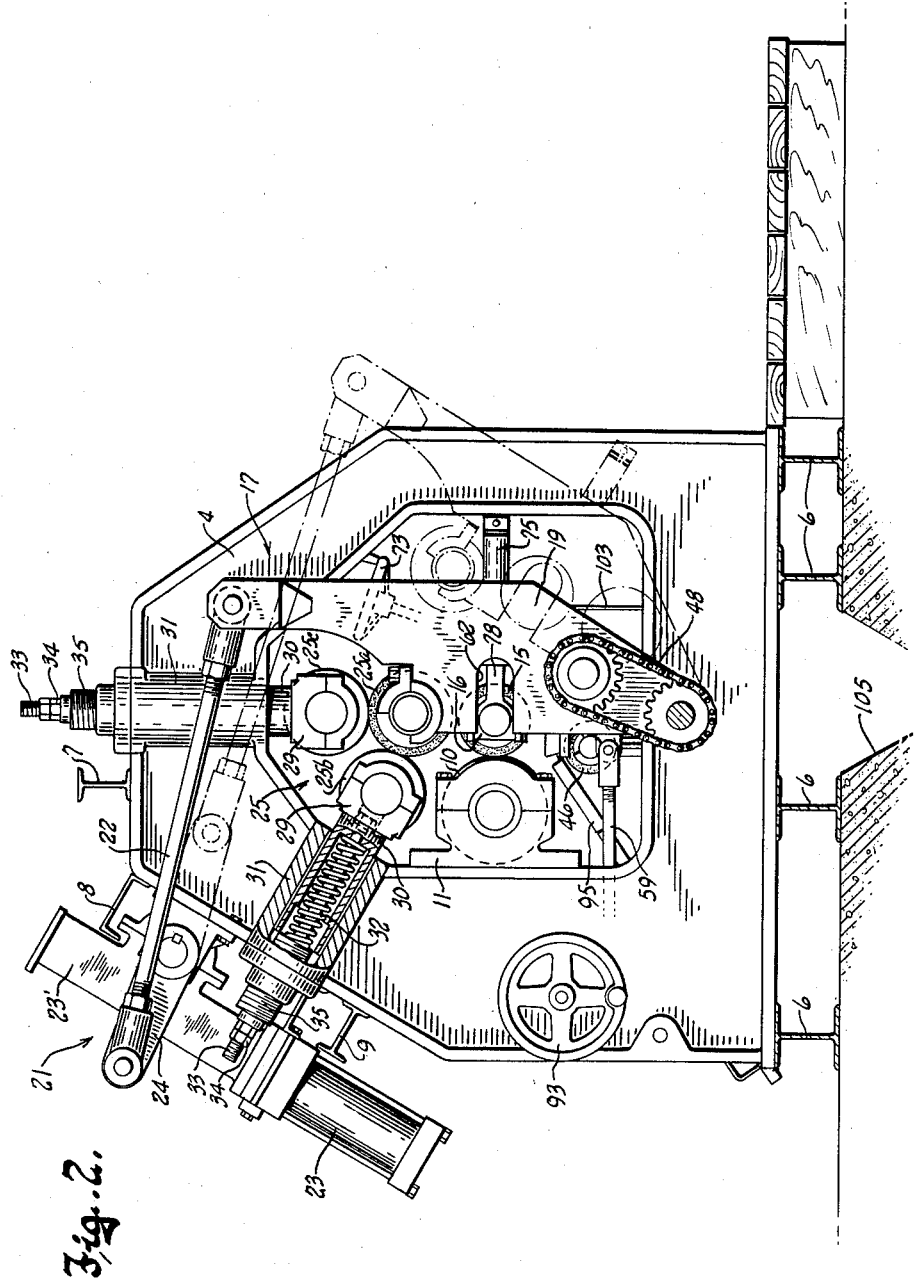
Figure 2 is essentially a left-side view of the machine, but to the extent that the adjacent drive shaft is in section.
Figure 3:
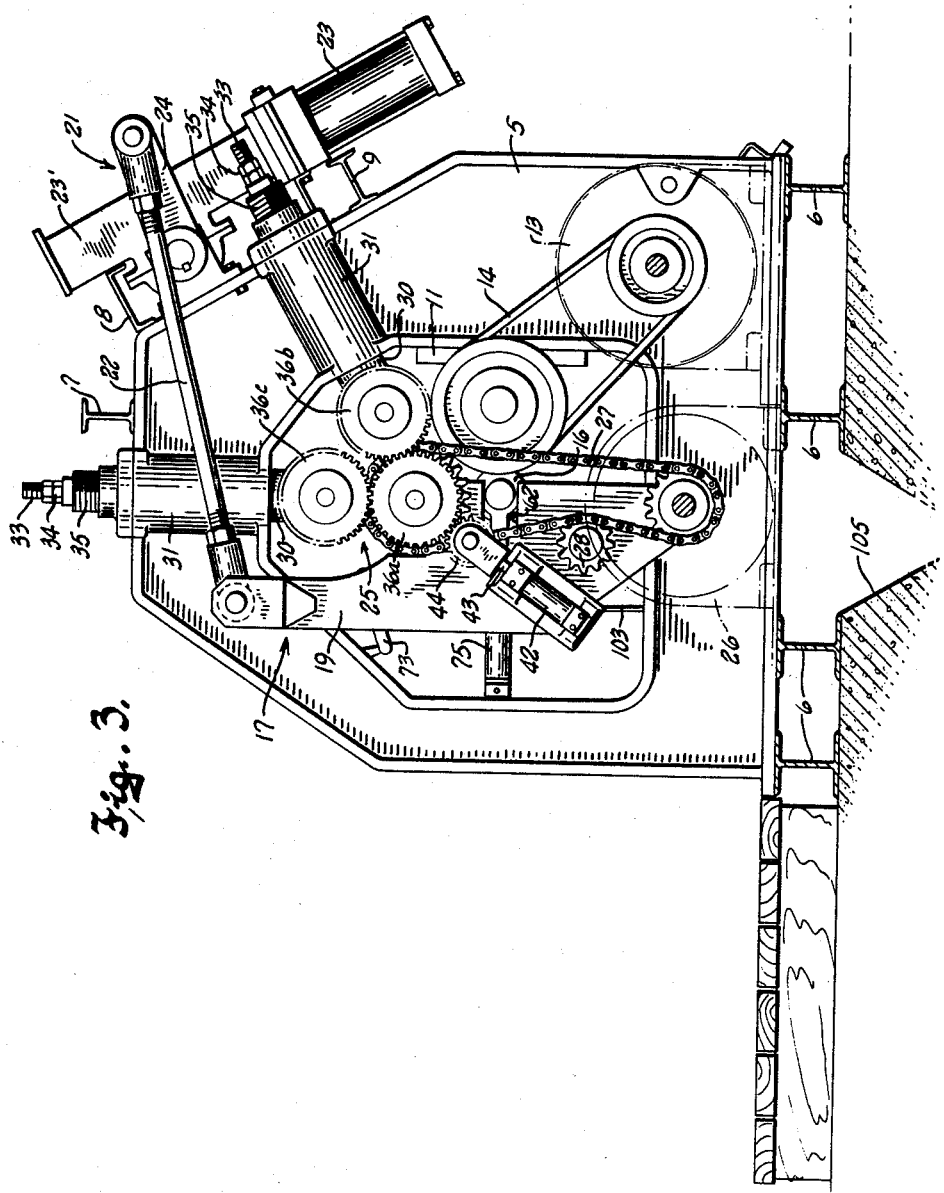
Figure 3 is a right-side view of the machine, taken on the plane of the line 3—3 and thus also, to the extent that that plane intersects the adjacent drive shafts, it may be regarded as a cross-sectional view.

One of the pressure rolls is positioned to be directly above the main driven roll 25a when the latter is in its operative position, and the other is located to the rear of the operative position of the driven roll. The mounting of the pressure rolls, as best seen in Figure 2, comprises bearings 29 in which the ends of the pressure roll shafts are journalled, and which bearings are carried by hollow sleeves 30 slidably received in cylinders 31 mounted on or cast integral with the side frames. The axes of the cylinders 31 lie in planes which are radial to the axis of the driven roll in its operative position. Inside each of the sleeves 30 is a compression spring 32. These springs yieldingly urge the bearing 29 and hence the pressure rolls journalled thereon, radially toward the operative position of the main driven draw roll 25a.

The degree of compression of the springs 32 is adjustable to hold the pressure rolls against the driven roll with a pressure necessary to positively draw the hide upwardly and out of the machine, it being understood that when the swing arm structure 17 is moved to its closed position, bringing the backup roll 15 and the power driven draw roll 25a into their respective operative positions, the pressure rolls 25b and 25c are pushed rearwardly and upwardly against the pressure of their respective springs 32.

When the swing arm structure is swung to its open position, and the springs 32 are freed to project the pressure rolls forwardly and downwardly, such spring produced motion of the pressure rolls is limited by tie-rods 33 which extend outwardly through the spring 32, and have stop nuts 34 fixed thereon to bear against the adjacent outer ends of spring stops 35 adjustably mounted in the cylinders 31.

At the right side of the machine, the shafts of the pressure rolls have gears 36b and 36c mounted thereon to mesh with a driving gear 36a which is drivingly connected to the shaft of the driven roll 25a through a flexible coupling, not illustrated in the general views because it is housed within the gear 36a, but shown in detail in Figure 10. As there shown, the gear 36a is cup-shaped to receive the coupling which comprises a hub portion 37 on the driven draw roll 25a, and a pair of collars 38 and 39. The opposing faces of the hub 37 and the drive gear 36a, as well as the opposite faces of the collars 38 and 39 have diametrically disposed grooves 40 in which keys 41 are slidably received. Each adjacent pair of faces has but one pair of such grooves, so that there are three sets of grooves equally angularly spaced, or in other words, disposed at 60° to one another. Accordingly, a torque transmitting connection is established between the driven roll 25a and its drive gear 36a, which allows a degree of axial misalignment between these parts, making it possible for the drive gear 36a to remain in mesh with the driven pressure roll gears 36b and 36c, despite shifting of the pressure roll gears in response to variations in thickness of the hide being acted upon by the draw rolls.

To maintain the draw roll gears in mesh during such shifting of the pressure rolls, the drive gear 36a is at all times yieldingly urged toward the driven gears 36b and 36c by a pressure cylinder 42 mounted on the swing arm structure with its axis lying in a plane which coincides with the axis of the driven draw roll and bisects the angle defined by the mounting of the two pressure rolls. The ram 43 of this hydraulic cylinder carries a pinion 44 which meshes with the drive gear 36a and, hence, imparts the thrust of the hydraulic cylinder against the drive gear to yieldingly urge the same toward and maintain the same in mesh with the driven gears 36b and 36c.

Hence, no matter which of the pressure rolls moves radially outward from the driven draw roll due to the passage therebetween of a locally thicker portion of the hide, the drive gear 36a will be kept in mesh with the driven gears 36b and 36c.

In addition to the fleshing means or fleshing couple which consists of the fleshing cylinder 12 and its backup roll 15, the machine also has a combined putting-out and demanuring means or couple comprising a bladed cylinder 45 and a backup roll 46. The bladed cylinder 45 is journalled in bearings carried by the swing arm structure and is located below the backup roll 15, or in other words, closer to the pivot axis of the swing arm structure. The blades 45' of the cylinder 45 are disposed helically like those of the fleshing cylinder, but where the blades of the fleshing cylinder have sharp edges, the blades 45' of the combined putting-out and demanuring cylinder have rounded edges, as best seen in Figures 11 and 12.

The bladed cylinder 45 is driven by its own motor 47, which is located at the left side of the machine coaxially with the axis about which the swing arm structure rocks. A sprocket chain drive transmission 48 connects the motor shaft with the shaft of the bladed cylinder 45.

Although the bearings by which the backup roll 46 is journalled could be secured directly to the side frames of the machine, the functioning of the machine is greatly improved by having the backup roll 46 mounted to swing rearwardly away from its operative position as the swing arm structure 17 is swung forward to open the machine. By this expedient, two significant advantages are achieved. First, when the machine is opened, the space between the complementary elements of the combined putting-out and demanuring couple, i.e. the bladed cylinder 45 and the backup roll 46 is increased; and, second, the objectionable possibility of having the hide fall between the fleshing cylinder and the backup roll 46 as it is placed or thrown into the machine is eliminated.

To mount the backup roll 46 for such retraction from its operative position upon opening of the machine, the bearings in which its shaft is journalled are carried by a pivoted structure, indicated generally by the numeral 49. This pivoted structure swings about a horizontal axis close to the axis about which the swing arm structure 17 rocks, and comprises a shaft 49' which extends across the machine and has three bell cranks 50 fixed thereon, one near each side frame and the third in the center of the machine. The bell cranks 50 have vertical and horizontal arms 51 and 51', respectively, and pivoted on the outer ends of the vertical arms 51 are secondary bell cranks 52 which also have vertical and horizontal arms 53 and 53', respectively. The bearings in which the backup roll 46 is journalled are on the outer ends of the vertical arms 53, and normally the secondary bell cranks simply move in unison with the bell cranks 50 with their vertical arms 53 in line with the arms 51 of the bell cranks 50. Compression springs 54 reacting between the horizontal arms of the bell cranks and tie rods 54' which limit spring produced relation motion between the bell cranks 50 and 52, yieldingly maintain the bell cranks in this normal relationship, but permit the backup roll 46 to yield, as shown in Figure 6, upon the passage of a particularly thick accumulation of flesh on the hide.

To rock the pivoted structure 49, and hence the backup roll 46 carried thereby, rearward as the swing arm structure 17 is swung forward, and vice versa, the two pivoted structures are interconnected by means of levers 55 and 56 mounted to swing in unison about a horizontal axis, and respectively connected to the structure 49 by tie rods 58, and with the swing arm structure by tie rods 59, the levers and tie rods being duplicated at opposite sides of the machine.

Figure 7:
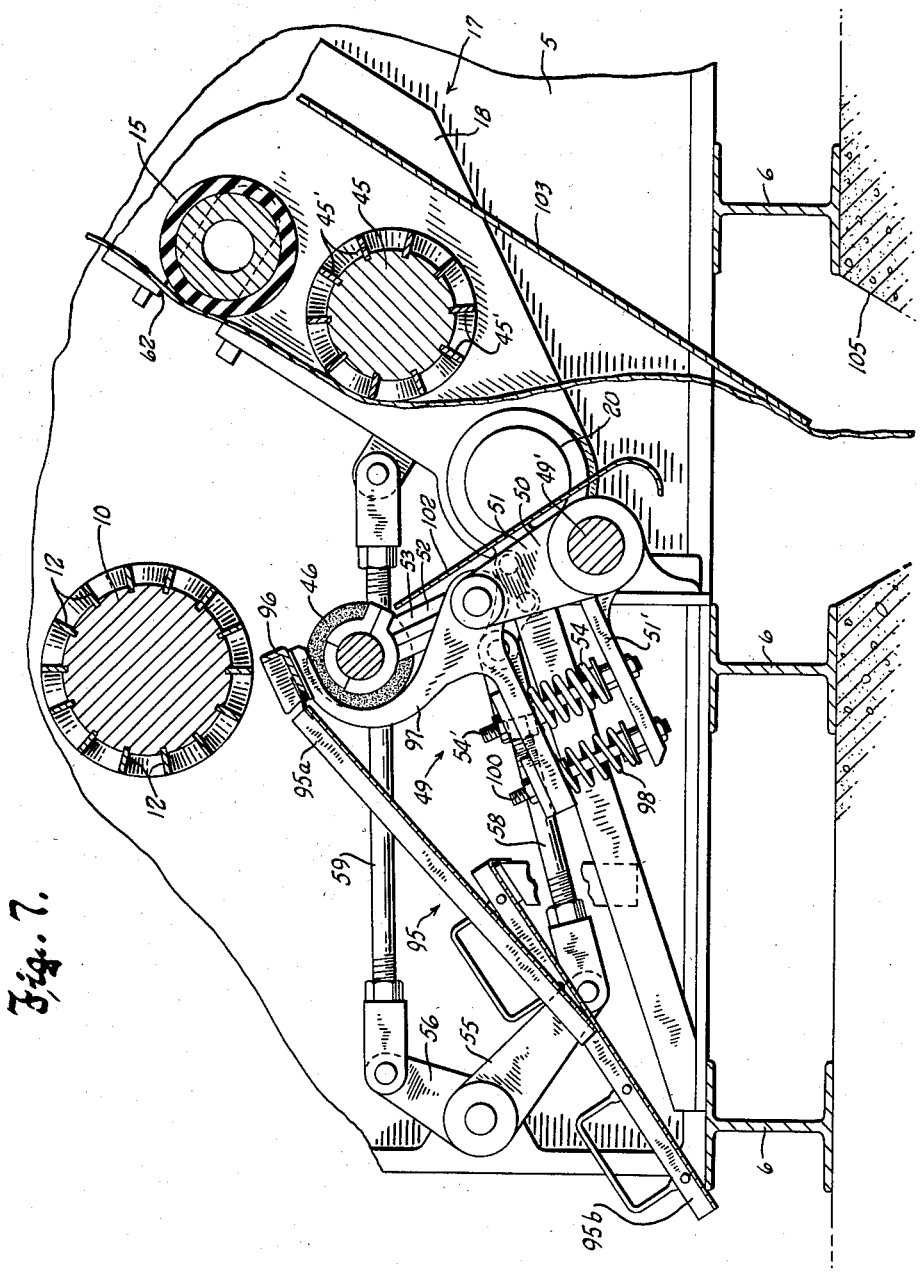
Figure 7 is a view similar to Figure 5 but showing the machine in its open position with a hide thrown or dropped into place preparatory to being acted upon.

As will readily appear from a comparison of Figures 5 and 7, the levers 55 and the tie rods 58 together comprise a toggle which is straightened out when the swing arm structure 17 swings to its closed position to thereby firmly hold the backup roll 46 in its operative position.

The combined putting-out and demanuring cylinder, like the fleshing cylinder, rotates in the direction tending to draw the hide downwardly against the pull exerted thereon by the draw rolls, but obviously, of course, the pull applied to the hide by these cylinders is not as great as that produced by the draw rolls. Consequently, the hide is drawn upwardly by the draw rolls, first through the putting-out and demanuring couple, and then through the fleshing couple.

As indicated hereinbefore, the blades 45' of the combined putting-out and demanuring cylinder are helically disposed and arranged to spread the hide transversely and, at the same time, serve to clean the hair side of the hide of all adhering clumps of manure and dirt. It is, of course, important that the putting-out and demanuring of the hide be done before the fleshing. The hide should be clean on its hair side during the fleshing operation. Clumps of manure and other dirt adhering to the hair side, if present at the time the fleshing is done, would project the adjacent portions of the hide so far into the bite of the fleshing knives that, in all probability, the knives would cut holes into the hide.

To assure that no fleshing will be done on any part of the hide that has not been cleaned of manure and dirt on its hair side, the operativeness of the fleshing couple is delayed for an interval after the machine is closed and the putting-out and demanuring operation is begun. To this end, the bearings 16 in which the backup roll 15 is journalled are movable laterally of the swing arm structure, and are held in retracted positions until the swing arm structure has moved into its closed position and enough of the hide has been demanured to bring a cleaned portion thereof opposite the fleshing cylinder.

As best seen in Figure 9, the bearings 16 (one at each side of the machine) are slidably mounted in guideways 61 between the inner and outer arms 18 and 19 of the swing arm structure, the arms 18 and 19 being provided with slot-like openings 62 to accommodate the shaft of the backup roll as it moves to and from its operative position. The guideways 61 are mounted on crossplates 63 which extend between and are secured to the inner and outer arms 18 and 19.

The inner end of each guideway which faces the fleshing cylinder is open to allow for assembly of the parts, but the outer end thereof has a barrel 64 fixed therein. Slidable in this barrel is a sleeve 65, the sleeve being constrained against turning in the bore of the barrel. Threaded onto the sleeve is an adjusting nut 66 in the form of a wormwheel. The nut is axially confined between the outer end of the barrel 64 and a pair of wearplates 67 mounted by means of takeup screws 68 upon crossbars 69. The opposite ends of these crossbars are fixed to bearing blocks 70, which in turn are rigidly joined to the arms 18 and 19.

A wormshaft 71 journalled in suitable bearings carried by the blocks 70 extends across the machine, and at its opposite ends has worms 72 which mesh with the wormwheels 66 to simultaneously adjust the sleeves 65 in or out. Adjusting actuation may be manually imparted to the wormshaft 71 by a handwheel 73 on a shaft which is journalled in a bearing carried by the swing arm structure, and drivingly connected to the wormshaft 71 through bevel gears 74.

The sleeves 65 have hydraulic cylinders 75 fixed on their outer ends by means of bases 76 bolted to the ends of the sleeves, and the rams 77 of these hydraulic cylinders are connected with the bearings 16 by connecting rods 78. Consequently, the hydraulic cylinders 75 provide fluid motors to slide the bearings 16 in and out. The rams 77 have strokes of fixed length so that when the rams are actuated to project the backup roll toward the fleshing cylinder, they bring the same to a definite position with respect to the swing arm structure and, of course, yieldingly hold it there. The exact location of this definite position is set by means of the hand wheel 73 in accordance with the thickness of the hides being worked upon.

As indicated hereinbefore, the backup roll 15 should be held in its inoperative position for an interval after the machine is closed and the demanuring operation begun, and this interval should be just long enough to assure having a cleaned portion of the hide in the fleshing couple when fleshing begins. To effect such delay in the fleshing operation, the hydraulic cylinders 75 are so connected into the hydraulic circuit that the fluid pressure necessary to bring the backup roll 15 into its operative position is not manifested in the cylinders 75 until after the desired time interval has elapsed.

In Figure 13, one way of obtaining this delay is diagrammatically illustrated. As there shown, a manually operable control valve 79 is connected between the pump 80 which supplies the hydraulic pressure and the cylinders 23 and 75, in such a way that upon actuation of the control valve toward the left (to close the machine) fluid pressure will be immediately manifested in the upper or right hand end of the cylinder 23. The connections by which this result is achieved comprise: a line 81 connected between the pump and the valve 79, a second line 82 connnected between the valve and the upper right hand end of the cylinder 23, a line 83 which leads from the lower left hand end of the cylinder 23 to the valve, and a line 84 which leads from the valve to the reservoir 85 of the system.

With the pressure built up in the upper right hand end of the cylinder 23, the swing arm structure 17 is rocked to its closed position and the demanuring means or couple becomes operative.

Although the cylinders 75 have their right hand ends connected by a line 86 with the same port of the valve which supplies the line 82, and have their left hand ends connected with the reservoir through a line 87, the valve, and the line 84, the cylinders 75 remain inoperative not only until the swing arm structure 17 has been swung to its closed position, but also for a definite predetermined interval thereafter. This follows from the fact that the line 86 has a pressure responsive valve 88 and a time delay valve 89 connected therein. The valve 88 remains closed until the ram of the cylinder 23 reaches the end of its stroke, when the full pressure delivered by the pump is available to actuate the valve 88; and the time delay valve, of course, does not open until the time interval for which it is set has passed. Thereupon, the cylinders 75 function to project the backup roll 15 into its operative position and fleshing begins.

When the portion of the hide being acted upon has been pulled through the demanuring and fleshing couples by the draw rolls, the operator moves the control valve 79 to its opposite position. This causes fluid pressure to be immediately manifested in the opposite ends of all of the cylinders, whereupon the swing arm structure 17 is swung to its open position and the fleshing cylinder backup roll 15 is retracted.

As indicated hereinbefore, the knives of the fleshing cylinder have sharp edges. It will, of course, be necessary after the machine has been in use for some time, for these edges to be sharpened, and although any suitable way of accomplishing this result may be employed, the present invention provides an especially convenient way of doing so. It comprises a sharpening stone 90 mounted upon a carriage 91 which is slidable along a rail 92. The rail 92 extends across the rear of the machine and has its ends secured to the side frames 4 and 5. A sprocket chain trained over sprockets carried by the opposite side frames with its ends connected to the carriage, and a handwheel 93 drivingly connected with one of the sprockets provides means for moving the carriage along the rail 92 to carry the sharpening stone 90 along the full length of the fleshing cylinder; and to feed the stone against the blades of the fleshing cylinder, a feed screw 94 is provided.

The flesh and fatty substance removed from the flesh side of hides drops onto chute means 95. This chute means comprises an angle iron cross bar 96 located directly above the backup roll 46 of the combined putting-out and demanuring couple, and downwardly and rearwardly sloping sections 95a and 95b. The cross bar 96 forms the topmost part of the upper receiving end of the chute means, and the lower section 95b has its discharge end positioned to direct the flesh and fatty substance into a receptacle (not shown) for collection without contamination by manure and dirt cleaned from the hide by the demanuring couple.

The cross bar 96 is supported in its position by bell crank levers 97 which, like the bell cranks 51, are pivotally carried by the levers 50. Accordingly, the cross bar 96 and the upper section 95a of the chute means swing back and forth with the backup roll 46 and to accommodate such movements the section 95a has its bottom end portion resting on the lower section 95b, as best seen in Figure 7.

To insure that the flesh and fatty substance removed from the flesh side of the hide drops onto the chute means 95, the upper receiving end of the chute means is not only positioned under the fleshing cylinder but also engages the flesh side of the hide so that the flesh and fatty substance cannot pass therebetween and fall onto the combined putting-out and demanuring couple and into the manure and dirt therebelow.

To assure engagement of the uppermost edge of the chute means with the portion of the hide stretched between the two couples, the chute means is yieldingly urged forwardly by coil springs 98 which automatically maintain the receiving end of the chute means in proper position regardless of variations in hide thickness, local accumulations of flesh and the degree of tension under which the hide is stretched.

Tie rods 100 limit the extent that the springs 98 rock the bell crank levers 97 about their pivots, and thus define the position of the upper end of the chute means when no hide is present. Thus, when the lower or trailing end of a hide clears the bite of the demanuring couple and is therefore no longer held taut between the demanuring and fleshing couples, the chute means is urged forwardly by the coil springs 98 to the maximum extent allowed by the tie rods 100. This, of course, projects the receiving end of the chute means into the area through which the hide is normally drawn when held by both couples and adds an extra measure of protection to insure that the flesh and fatty substance cut from the trailing end of the hide will not be lost by failure of the chute means to catch it as it falls from the fleshing cylinder. The tie rods 100 are so adjusted, of course, as to allow the cross bar 96, which forms the uppermost end of the chute means, to be moved only to a position closely adjacent to, but not touching, the demanuring cylinder.

To prevent the depending portion of the hide coming in contact with the pivoted structure which supports and mounts the backup roll 46, a guard plate 102 is provided. This guard plate is conveniently mounted by being secured to the levers 50.

The guard plate 102 also serves to keep manure and other dirt away from the flesh and gelatinous material which, of course, should be kept free from such contaminants, and coacts with another guard plate 103 suspended vertically across the front of the machine, to conduct the manure and dirt removed from the hair side of the hide into a pan or conveyor mounted below the machine, or into a hole or discharge chute 105 in the floor upon which the machine is mounted.

Operation

The operator having actuated the control valve 79 to open the machine, its swing arm structure 17 occupies the position indicated in dotted lines in Figure 2 and shown in full lines in Figure 7. A hide is then "thrown" into the machine, i.e. deposited by the operator over the driven roll 25a of the draw rolls with a substantial portion of the hide hanging down therefrom and with the hair side lowermost, that is, with respect to the draw roll 25a.

This places the depending portion of the hide between the fleshing cylinder and its backup roll which together comprise the fleshing means or fleshing couple and between the bladed cylinder 45 and its cooperating backup roll 46 which together comprise the combined putting-out and demanuring means or couple.

Figure 4:
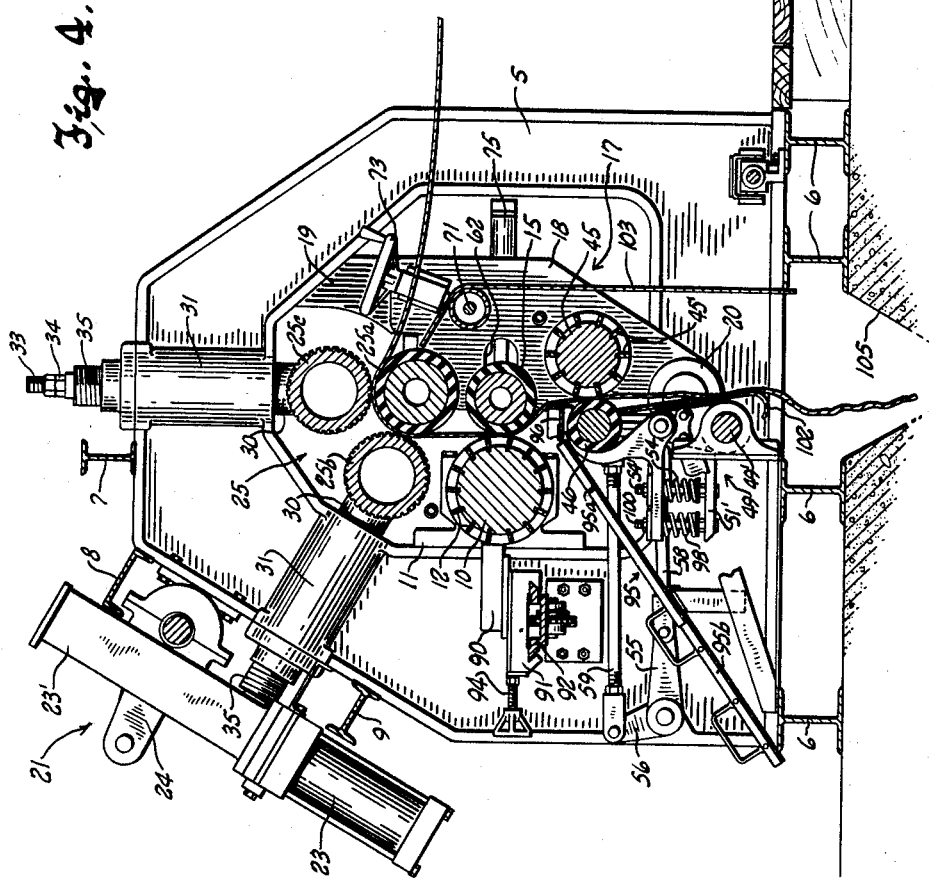
Figure 4 is a cross-sectional view through Figure 1 on the plane of the line 4—4.

Thereupon, the operator actuates the valve 79 to close the machine and, with such actuation of the valve, fluid pressure is immediately manifested in the cylinder 23 to cause the swing arm structure 17 to be swung inward to its operative position shown in full lines in Figures 2, 4 and 5. As the swing arm structure assumes its operative position, the hide is gripped by the draw rolls which begin to pull the hide upwardly and to discharge the same forwardly toward the operator who may let the hide hang down over the guard plate 103, or may take the hide as it is fed to him.

Simultaneously with the closure of the draw roll 25, the combined putting-out and demanuring means or couple is rendered operative, i.e. the cylinder 45 rotating in the direction tending to pull the hide downwardly against the pull exerted thereon by the draw rolls, straightens the hide by spreading it out transversely and, at the same time, its blades knock off accumulations of manure and other dirt on the hair side.

At this time, the fleshing couple is open, i.e. inoperative, as shown in Figure 11, and the hide extends straight from the cross bar 90 to the bite of the draw rolls. When a sufficient length of the hide has been cleaned of manure and dirt to bring a clean portion thereof into the fleshing couple, the timing valve which delays the response of the hydraulic cylinders 75 will have "timed out" and the backup roll 46 will then be projected rearwardly to press the hide against the fast revolving fleshing cylinder.

From this point on, the hide is not only put-out and demanured, but also fleshed, until the trailing end of the hide passes from the bite of the putting-out and demanuring means or couple and then, for a brief instant, only fleshing takes place.

From the description of the structure of the machine, it should of course be appreciated that, although the demanuring and fleshing take place simultaneously, the respective by-products of these two operations are kept apart so that both may be economically and independently handled for subsequent utilization.

In accordance with common practice, half a hide is worked on at a time; and when the hide has been fully cleaned and fleshed, it is salted on its flesh side and either stored for a while at the packing plant, or shipped to the tannery. Since the dirt and flesh have already been removed from the hide at the time of shipment, it follows that the shipping costs are considerably lower than they were prior to this invention, and it also follows that much of the useful by-product, namely, the flesh, fat and gelatinous material adhering to the flesh side of the hide and the manure and so forth on the hair side of the hide can be saved and put to a useful purpose.

If for some reason it may be desirable not to effect demanuring in the same machine which does the fleshing, the arrangement of cylinders and backup rolls illustrated in Figure 14 may be employed. In this arrangement, a bladed putting-out cylinder 106, like the combined putting-out and demanuring cylinder 45, acts upon the flesh side of the hide, to effect the straightening of the hide before it reaches the fleshing cylinder, which as noted hereinbefore, is necessary to successfully flesh fresh green hides.

From the foregoing description, taken in connection with the accompanying drawings, it will be apparent to those skilled in the art, that this invention provides a machine especially useful in the preparation of fresh green hides for tanning, and that through this machine the method which forms the subject matter of the aforesaid copending application Serial No. 670,266, and its present improvement, are most conveniently practiced.

What is claimed as my invention is:

1. In a machine for preparing fresh green hides for tanning, the combination of: a combined putting-out and demanuring couple comprising a bladed cylinder and a backup roll to press a hide against said cylinder; a fleshing couple comprising a fleshing cylinder and a backup roll to press a hide against the fleshing cylinder; cooperating draw rolls to grip and pull a hide edgewise through said two couples; means mounting both said couples and the cooperating draw rolls for movement between open and closed positions with the fleshing couple located between the draw rolls and the combined putting-out and demanuring couple so that a hide being pulled through the closed couples by the draw rolls with its hair side facing the bladed cylinder of the putting-out and demanuring couple will be simultaneously put-out and cleaned on its hair side as it moves to the fleshing couple; and hydraulic means to open and close the draw rolls and to open and close said two couples, said hydraulic means including a time delay mechanism to delay closure of the fleshing couple for a predetermined time after the draw rolls and the combined putting-out and demanuring couple have been closed.

2. In a machine for preparing fresh green hides for tanning, the combination of: a combined putting-out and demanuring couple comprising a bladed cylinder and a backup roll to press a hide against said cylinder; a fleshing couple comprising a fleshing cylinder and a backup roll to press a hide against the fleshing cylinder; cooperating draw rolls to grip and pull a hide edgewise through said two couples; means mounting both said couples and the cooperating draw rolls for movement between open and closed positions with the fleshing couple located between the draw rolls and the combined putting-out and demanuring couple so that a hide being pulled through the closed couples by the draw rolls with its hair side facing the bladed cylinder of the putting-out and demanuring couple will be simultaneously put-out and cleaned on its hair side as it moves to the fleshing couple, the means mounting said couples including a swing arm structure mounted to swing about an axis parallel to the axes of the cylinders and backup rolls of the couples toward and from a closed position, the backup roll of the fleshing couple being carried by the swing arm structure to be brought into juxtaposition to the fleshing cylinder by movement of the swing arm structure to its closed position; manually controlled means to simultaneously close the draw rolls and the combined putting-out and demanuring couple and to swing the swing arm structure to its closed position; power means to project the backup roll of the fleshing couple into cooperative relation with its cylinder to thereby fully close the couple; and means to coordinate the operation of said power means with said manually controlled means and thereby delay the closing of the fleshing couple for an interval long enough to assure that the hide will be put-out or spread transversely and cleaned of dirt and manure on its hair side before it is acted upon by the fleshing couple.

3. In a machine for preparing hides for tanning, the combination set forth in claim 2 wherein the backup roll of the fleshing couple is mounted on the swing arm structure by guide means on the swing arm structure, and bearing means, movably supported by the guide means and having the backup roll journaled therein, and wherein the means for delaying the start of the fleshing operation comprises: means acting upon said bearing means to hold the backup roll in a retracted position in which it is incapable of pressing a hide against the fleshing cylinder even though the swing arm structure is in its closed position, and hydraulic pressure means rendered operative at a predetermined time after the swing arm structure reaches its closed position to move said bearing means along the guide means in the direction to carry the backup roll toward and into cooperative relation with the fleshing cylinder.

4. In a machine for preparing hides for tanning, the combination set forth in claim 3 wherein said hydraulic pressure means comprises a hydraulic cylinder having relatively axially extensible and retractable members, one of which is connected to said bearing means and the other of which is mounted on the swing arm structure for limited axial movement with respect to the swing arm structure; and further characterized by means carried by the swing arm structure for effecting limited axial movement of said other cylinder member with respect to the swing arm structure to thereby enable adjustment of the nominal spacing between the fleshing cylinder and its backup roll when the latter is in cooperative relationship with the fleshing cylinder.

5. In a machine for preparing hides for tanning, the combination set forth in claim 4 wherein said means for effecting the limited axial movement of said other cylinder member comprises: a captive screw threaded member mounted on the swing arm structure and constrained to rotate about an axis parallel with the axis of the cylinder; and means on said other cylinder member having threads thereon cooperatively engaging the threads of said captive screw threaded member so that rotation of the latter effects axial adjusting movement of the hydraulic cylinder with respect to the swing arm structure.

6. In a machine for preparing hides for tanning, the combination set forth in claim 4 wherein said means for effecting the limited axial movement of said other cylinder member comprises: a screw threaded element on and coaxial with said other cylinder member; a nut threaded on said element; means on the swing arm structure securing the nut against axial displacement with respect thereto so that rotation of the nut moves said other cylinder member axially; and manually operable means for turning the nut.

7. In a machine for preparing hides for tanning, the combination of: a fleshing couple comprising a rotatable fleshing cylinder mounted to rotate about a fixed horizontal axis and a rotatable backup roll for holding a hide against the fleshing cylinder; a swing arm structure; bearings carried by the swing arm structure and in which the backup roll is journaled; means mounting the swing arm structure for pivotal motion about a fixed horizontal axis which is parallel to the axis of the fleshing cylinder from an open to a defined closed position, during which motion the backup roll is brought into juxtaposition to the fleshing cylinder; means for swinging the swing arm structure to its closed position; said bearings having limited motion with respect to the swing arm structure to enable the backup roll to be moved toward and from the fleshing cylinder when the swing arm structure is in its closed position; and power operated means carried by the swing arm structure and operatively connected with said bearings to move the backup roll into cooperative relationship with the fleshing cylinder after the swing arm structure has reached its closed position.

8. The structure set forth in claim 7 further characterized by adjustable means for defining the position to which the power operated means moves the backup roll in bringing the same into cooperative relationship with the fleshing cylinder to thereby enable the setting of the fleshing couple to be adapted to different hide thicknesses.

9. In a machine for preparing hides for tanning, the combination set forth in claim 7, further characterized by: the fact that the power operated means has a fixed stroke and is adjustable on the swing arm structure in the direction of the permitted movement of the bearings; and means carried by the swing arm structure for adjusting the position of the power operated means relative to the swing arm structure to thereby set the nominal spacing between the backup roll and the fleshing cylinder when the two are in cooperative relation.

10. In a machine for preparing fresh green hides for tanning: a combined putting-out and demanuring couple comprising a bladded cylinder, and a backup roll to hold a hide against said bladed cylinder; a fleshing couple comprising a bladed fleshing cylinder, and a backup roll to hold a hide against the fleshing cylinder; means mounting the fleshing cylinder for rotation about a fixed horizontal axis; a swing arm structure mounted to swing about a fixed horizontal axis between a closed operative position adjacent to the fleshing cylinder and an open inoperative position spaced away from the fleshing cylinder; means mounting the backup roll of the fleshing couple on said swing arm structure; means mounting the bladed cylinder of the combined putting-out and demanuring couple on said swing arm structure; the backup roll of the fleshing couple being so located on the swing arm structure that upon swinging movement of said structure toward the fleshing cylinder and into its closed operative position said backup roll is brought into juxtaposition to the fleshing cylinder, such movement of the swing arm structure also moving the bladed cylinder of the combined putting-out and demanuring couple into its operative position; a pivoted structure mounted to swing about a horizontal axis parallel and adjacent to the axis about which said swing arm structure swings, and carrying said backup roll of the combined putting-out and demanuring couple, with said roll in the path of the bladed cylinder of said putting-out and demanuring couple; means driving the bladed cylinders of both couples in the same direction tending to draw a hide held thereagainst downwardly; draw rolls mounted above the fleshing couple to grip and pull the hide upwardly through the machine against the tendency of said couples to pull the hide downwardly; and means interconnecting said pivoted structure with the swing arm structure to cause said two structures to swing in opposite directions, so that when the swing arm structure is swung to its open position, both couples will be opened wide to facilitate dropping a hide into position to be acted upon.

11. The structure of claim 10, further characterized by the fact that said pivoted structure is so disposed that when the couples are open the backup roll carried by the pivoted structure is under the bladed fleshing cylinder so as to guard against having the hide pass between said backup roll and the fleshing cylinder during placement of the hide into the machine.

12. In a machine for preparing hides for tanning including a fleshing couple comprising a pair of cooperating rotatable elements: a putting-out couple comprising a pair of cooperating rotatable elements; means mounting one of the rotatable elements of one couple for rotation about a fixed axis; a pair of swing arm structures mounted to pivot about axes parallel to said fixed axis to and from defined closed positions; means mounting the other rotatable element of said one couple on one swing arm structure in a position for cooperation with its respective rotatable element when said swing arm structure is in its closed position; means mounting one of the rotatable elements of the other couple on one of the swing arm structures and its cooperating element on the other swing arm structure to be brought into cooperative relation as a consequence of both swing arm structures being swung to their closed positions; and means interconnecting the swing arm structures and constraining them to move simultaneously in opposite directions.

13. In a machine for preparing hides for tanning, the combination of: a substantially horizontally disposed fleshing couple comprising a bladed fleshing cylinder and a backup roll to press the flesh side of a hide against the fleshing cylinder; a substantially horizontally disposed demanuring couple separate from the below the fleshing couple and comprising a demanuring cylinder and a backup roll to press the hair side of a hide against the demanuring cylinder; both couples tending to pull a hide in the bite thereof downwardly so that a hide drawn upwardly and successively through said two couples will have a portion thereof stretched between them and will have manure and dirt removed from its hair side and flesh and fatty substances cut from its flesh side; chute means for catching all flesh and fatty substances cut from a hide by the fleshing cylinder and delivering the same from the machine in an uncontaminated condition; and means mounting said chute means with its upper end portion disposed below the fleshing couple and above the demanuring couple to catch flesh and fatty substances dropping from the fleshing couple, said mounting means holding the chute means with the uppermost edge thereof positioned to press against the portion of a hide stretched between the couples to assure against flesh and fatty substances removed from the hide dropping onto the demanuring couple and into the dirt removed thereby.

14. The structure set forth in claim 13, further characterized by the fact that the mounting means for the chute means allows for limited movement thereof and includes means for yieldingly biasing the upper edge of the chute means in the direction to bring more of the chute means under the fleshing couple and to press the uppermost edge of the chute means against the portion of a hide stretched between the two couples.

15. In a machine for preparing hides for tanning, the combination set forth in claim 13 further characterized by: pivoted means mounting the backup roll of the demanuring couple for retraction from its position cooperable with the demanuring cylinder; and by the fact that the upper receiving end portion of said chute means is carried by said pivoted means so as to partake of retracting motion of the backup roll of the demanuring couple.

16. In a machine for preparing fresh green hides for tanning: cooperating draw rolls to grip and pull a hide along a defined path, comprising a driven roll and a plurality of pressure rolls parallel to and cooperative with the driven roll; a movable support for the driven roll to carry the same between an operative position bearing against the pressure rolls and an inoperative position removed a substantial distance from the pressure rolls; mounting means for the pressure rolls including means for biasing the same toward the operative position of the driven roll so that the pressure rolls press against the driven roll when the latter is in its operative position, and variations in thickness of a hide in the grip of the draw rolls are accommodated; a driven gear on the shaft of each pressure roll; a driving gear; a flexible driving coupling between the driving gear and the shaft of the driven roll, said driving gear meshing with the driven gears when the driven roll is in its operative position; and means biasing the driving gear toward the driven gears to maintain the driving gear in mesh with all of the driven gears regardless of movement of the pressure rolls toward and from the driven roll.

17. In a machine for preparing fresh green hides for tanning, means to grip and pull a hide along a defined path comprising: a main driven roll; a swing arm structure mounting said driven roll for movement to and from its operative position; a pair of pressure rolls; means mounting the pressure rolls in spaced apart relation with their axes parallel to the axis of the driven roll and in position to have the driven roll tangentially bear against both pressure rolls as the driven roll is moved to its operative position, the mounting means for the pressure rolls including yielding pressure applying means to urge each of the pressure rolls radially toward the operative position of the driven roll so that each pressure roll is independently movable toward and from the driven roll to accommodate variations in thickness of a hide passing therebetween; a gear on the shaft of each of the pressure rolls; a driving gear; a flexible coupling between the driving gear and the shaft of the driven roll permitting a degree of axial misalignment between the driving gear and the driven roll, said driving gear moving into mesh with the gears on the pressure roll shafts as the driven roll is moved into its operative position; and yieldable means urging the driving gear toward the gears on the pressure roll shafts to maintain the same in mesh therewith despite increased separation between the driven roll and the pressure rolls occasioned by the passage of locally thicker portions of the hide.

18. The structure of claim 17 wherein the means biasing the pressure rolls toward the operative position of the driven roll comprises compression springs, and wherein the means for holding the driving gear in mesh with the gears on the pressure roll shafts comprises a hydraulic cylinder mounted on the swing arm and operatively connected with the driving gear to exert pressure thereon.

19. The structure of claim 18 further characterized by the fact that said hydraulic cylinder acts upon the driving gear through a pinion which meshes with the driving gear.

References Cited in the file of this patent

UNITED STATES PATENTS

| | | |
|---|---|---|
| 762,949 | Sears | June 21, 1904 |
| 993,068 | Hutchinson | May 23, 1911 |
| 1,223,424 | Ruhe | Apr. 24, 1917 |
| 2,666,317 | Griffin | Jan. 19, 1954 |
| 2,669,112 | Griffin | Feb. 16, 1954 |

UNITED STATES PATENT OFFICE

CERTIFICATE OF CORRECTION

Patent No. 2,932,185                          April 12, 1960

Henry W. Bode

It is hereby certified that error appears in the printed specification of the above numbered patent requiring correction and that the said Letters Patent should read as corrected below.

Column 1, line 60, after "flesh" insert -- fresh --; column 4, line 8, for "or other" read -- and other --; line 72, for "two rolls" read -- two pressure rolls --; column 13, line for "bladded" read -- bladed --; line 71, for "from the below" read -- from and below --.

Signed and sealed this 20th day of September 1960.

(SEAL)
Attest:
KARL H. AXLINE
Attesting Officer

ROBERT C. WATSON
Commissioner of Patents